United States Patent Office 3,817,896
Patented June 18, 1974

3,817,896
PROCESS FOR THE PREPARATION OF STABLE, AQUEOUS COPOLYMER DISPERSIONS OF VINYL ESTERS AND ETHYLENE
Eduard Bergmeister, Peter Ludwig, Hubert Wiest, and Erwin Lieb, Burghausen, Germany, assignors to Wacker-Chemie GmbH, Munich, Germany
Filed Mar. 13, 1972, Ser. No. 234,196
Claims priority, application Germany, Mar. 17, 1971, P 21 12 769.5
Int. Cl. C08f 45/24
U.S. Cl. 260—29.6 R 10 Claims

ABSTRACT OF THE DISCLOSURE

A process for the preparation of stable, aqueous copolymer dispersions of ethylene and vinyl esters, particularly vinyl acetate, containing from 5 to 50% by weight of ethylene by emulsion polymerization in the presence of redox catalysts, protective colloids and/or emulsifiers, characterized in that the monomers together with the total amount of the reducing agent is charged together with auxiliary aqueous dispersion agents. Then a peroxide component is dosed-in so that a constant polymerization temperature is maintained between 0 and 100° C. and the cooling capacity of the reaction vessel is utilized.

THE PRIOR ART

Aqueous dispersions of copolymerizates of vinyl esters and ethylene, whose ethylene content is usually less than 50% by weight, are of great technical interest because they possess good application properties as adhesives and coating binders. In a number of patents, the preparation of such dispersions by means of emulsion polymerization at ethylene pressures up to 300 at abs. pr. (atmospheres absolute pressure) in the presence of peroxide compounds, with or without addition of reducing agents, has already been described.

It is frequently disclosed in the patent literature that by the dosing of a single or of several polymerization ingredients, the quality of the dispersions and the mechanical properties of the polymers can be improved.

British Pat. No. 1,117,711 describes keeping the ethylene pressure constant during the polymerization. According to the German Patent DAS 1,127,085, not only is the catalyst continuously re-added during the polymerization but also the ethylene. Furthermore, the German Patent DAS 1,267,429 discloses a process that produces copolymers with increased tear resistance at the same ethylene content. In this process peroxides as well as reducing agents are used as catalyst components, whereby one of these two catalyst components is first charged; and then the second together with the vinyl ester is dosed into it. This enables the ratio of catalyst to monomer to remain constant in the reaction vessel. By this process, however, polymers with low molecular weights (K-values under 45) are formed, which exhibit surface stickiness and a tendency to cold flow.

The disadvantages of all known processes are that they do not produce a speedy and uniform polymerization process and in addition do not lead to homogeneously synthesized copolymerizates. In the prior art processes, high catalyst concentrations are necessary, in order to attain commercially feasible reaction speeds and a high degree of reaction completion. Furthermore, for achieving and maintaining the optimum reaction peaks, it is essential to maintain reserves of cooling and pressure capacities. This means that the cooling and pressure capacities of the polymerization reactors cannot be completely utilized. These known processes are also disadvantageous in that the remaining residual monomer content is relatively high. The requisite use of high quantities of catalyst also lead to a greater water sensitivity of the polymerizate films; and they lower the degree of polymerization.

OBJECTS OF THE INVENTION

An object of the present invention is in the process for the preparation in a cooled zone of stable aqueous copolymerizates from ethylene and free radical polymerizable monomers, containing from 5% to 50% by weight of ethylene which comprises the step of polymerizing said ethylene and said monomers in an aqueous dispersion utilizing a redox polymerization catalyst system comprising (1) a reducing agent and (2) a percompound within a cooled zone, the improvement which comprises continuously dosing into said aqueous dispersion a solution of said percompound at a rate dependent on the cooling capacity of said cooled zone whereby a constant polymerization temperature between 0° C. and 100° C. is maintained.

It is another object of the present invention to provide a development in a process for the preparation of stable aqueous copolyemrizates of ethylene and a free radical polymerizable monomer, which comprises the steps of preparing an initial mixture consisting essentially of (A) ethylene, (B) a monomer selected from the group consisting of vinyl esters and other copolymerizable olefinic-unsaturated comonomers, (C) a reducing agent, and (D) optionally heavy metal salts, in an aqueous mixture containing auxiliary aqueous dispersion agents, polymerizing the initial mixture to produce the copolymerizates, and recovering the copolymerizates, the improvement which comprises continuously dosing into said initial mixture from 0.005% to 0.5% by weight based upon the polymerizate of a percompound in such a manner as to maintain a constant polymerization temperature between 0 and 100° C. and to utilize the cooling capacity of the reaction vessel.

It is a further object of the present invention to provide a stable aqueous copolymerizate of ethylene and free radical polymerizable monomer produced by the above process.

Other and further objects of the present invention will become apparent as the description thereof proceeds.

THE DRAWINGS

DESCRIPTION OF THE INVENTION

Figure 1A:
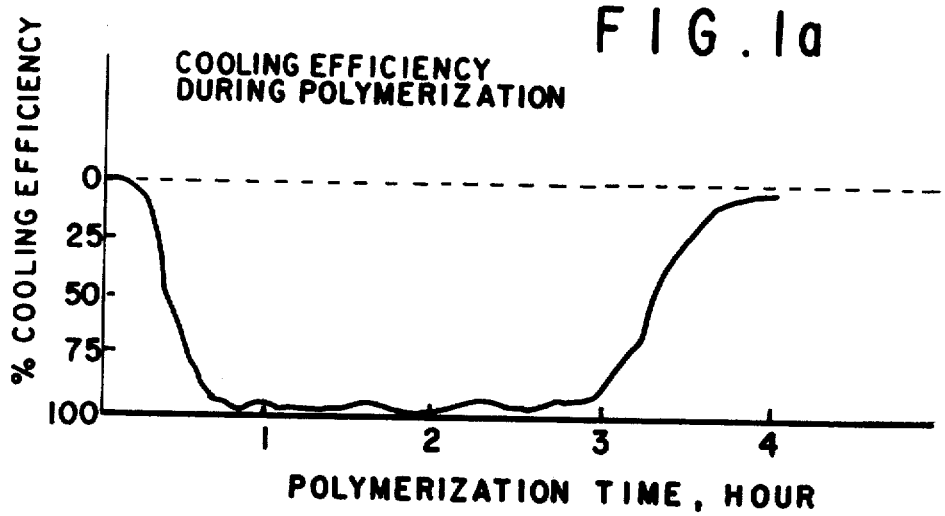
FIG. 1a shows the cooling efficiency during polymerization as a function of the polymerization time.

The drawbacks of the prior art have been overcome and the above objects achieved by the process of the invention. This process involves in the process for the preparation in a cooled zone of stable aqueous polymerizates from ethylene and free radical polymerizable monomers, containing from 5 to 50% by weight of ethylene which comprises the step of polymerizing said ethylene and said monomers in an aqueous dispersion utilizing a redox polymerization catalyst system comprising (1) a reducing agent and (2) a percompound within a cooled zone, the improvement which comprises continuously dosing into said aqueous dispersion a solution of said percomopund at a rate dependent on the cooling capacity of said cooled zone whereby a constant polymerization temperature between 0° C. and 100° C. is maintained.

The process of the invention involves the preparation of stable, aqueous copolymerizates of vinyl esters, particularly vinyl acetate, with from 5% to 50% by weight of ethylene. This process is based upon emulsion polymerization in the presence of redox catalysts, protective colloids and/or emulsifiers. The process is characterized by the procedure of having the vinyl ester together with the reducing agent charged into the aqueous dispersion auxiliary solution. Next the peroxide component is dosed into this solution so that alone with the utilization of the cooling capacity of the reaction vessel, a constant polymerization temperature is maintained in the range of 0 to 100° C.

By means of the dosing of the peroxide into the solution in an amount that is necessary for the instantaneous formation of the polymer radicals, it is possible to attain an exact control of the polymerization rate. It is thereby surprising that slight changes in the dosing amounts have immediate effects on the polymerization rate. Hence the cooling and pressure capacity of the autoclave used can be fully utilized without impairing the safety of the operation. If a slight increase in the polymerization rate occurs, which would be noticeable by a slight rise of the polymerization temperature, then by means of a slight reduction in the amount of the peroxide dosed, the polymerization rate is at once reduced. In emergency situations the dosing is completely stopped and since no excess amounts of peroxide are present in the autoclave, the polymerization very quickly ceases. On the other hand, an increase in the dosing of the peroxide immediately causes an increase in the polymerization rate. The dosing is regulated by the control of the polymerization temperature which results in the best utilization of the cooling capacity of the autoclave. If the dosing is carried out continuously in such a manner that the given temperature of the reaction mixture and the corresponding outlet temperature of the cooling water are kept constant, then the best utilization of the cooling capacity of the autoclave will result. In other words, the outlet temperature of the cooling water should have a value, which is just sufficient, not to permit the temperature of the reaction mixture to rise.

The dosing can be performed automatically or by manual control. In both cases temperature and/or pressure graphs give information about the present polymerization conditions and thus about the necessary controlling measures.

If, however, the known prior art process is utilized in which there is the initial charging of all the oxidizing agent along with the dosing of the reducing agent, or if as specified in DAS 1,267,429, there is a partial charging of the reducing agent and oxidation agent into the vinyl ester ethylene copolymer dispersions in the course of the reaction, changing and irregular polymerization rates are obtained. Thus the polymerization proceeds in spurts, which has the effect of strong fluctuations of the reaction temperature or in the cooling water temperature. A complete utilization of the cooling and pressure capacities of the reactor is, therefore, not possible, according to the known process. Furthermore, at the end of the polymerization reaction a few percent of unreacted monomeric vinyl ester are still present.

The present invention has the following advantages which cannot be expected from the prior art. These advantages include an exact control of the polymerization reaction, a reduction in the polymerization reaction time, and a reduction in the peroxide consumption. In addition thereto the present invention results in stable dispersions, free of coagulates, obtained from a polymerizate which is synthesized very uniformly, has a high molecular weight and possesses improved mechanical properties, particularly when compared to polymerizates, which were prepared according to the process of the DAS 1,267,429, which already have a good tear resistance.

A still further advantage is that the dispersions prepared according to the invention contain only slight amounts of residual monomers, so that the raw materials can be almost completely utilized and so that only small amounts of residual monomers have to be removed to obtain a purified product.

As reaction vessels it is preferred to use autoclaves which can be cooled, which are provided with dosing devices and which are often equipped with stirring apparatus and baffle plates.

The polymerization is carried out according to the following procedure. Aqueous emulsifiers and protective colloid solutions containing reducing agents and optionally heavy metal salts and vinyl ester are charged into the reaction vessel and heated to the polymerization temperature with agitation. After the addition of ethylene to this system, the dosing of the peroxide is started. It has been found that at the beginning of the polymerization, the peroxide is quickly used up.

The addition of the peroxide is increased until the maximum cooling capacity of the autoclave has been attained at which point an increase in the rate of the polymerization is no longer recommended. This point can be noticed by a rise in the polymerization temperature beyond the desired value. The required amounts of peroxide to be dosed can be divided into three phases, which extend over the polymerization time. At the beginning of the polymerization reaction, there is, for a short period of time, a strong but declining peroxide consumption. In the second phase of the polymerization reaction over a longer period of time, slight amounts of peroxide are charged; and during this phase the largest part of the monomers is polymerized. Towards the end of the polymerization reaction, once again there is a strong increase in the addition of peroxide for the final polymerization to occur. In some cases after termination of the dosing of the peroxide, a short after-polymerization is performed. The dosing is carried out mostly in the form of dilute solutions of the peroxide.

The polymerization can be carried out at temperatures between 0° and 100° C., preferably 10° C. to 60° C. The ethylene pressure is between 3 and 150 at. abs. pr., preferably 5 to 150 at. abs. pr. The ethylene can be added in the following manner: once at the start and then continuously thereafter so as to maintain the above pressure until a certain percentage of the vinyl ester has reacted, or it can be optionally added beyond the complete reaction of the vinyl ester. Also it is possible to start the polymerization reaction without ethylene being present or it is possible to carry out the polymerization with a changing ethylene pressure.

As further monomer components, all free-radical polymerizable unsaturated compounds can be employed either individually or in combination. The following are examples of such monomers: vinyl esters of straight or branched carboxylic acids with 1 to 18 carbon atoms, for example, vinyl alkanoates such as vinyl acetate, vinyl butyrate, vinyl propionate, vinyl laurate, vinyl pivalate, vinyl 2-ethylhexoate, isononanoic vinyl ester, vinyl isotridecanoate; vinyl esters of branched chain alkanoic acids having from 9 to 20 carbon atoms such as vinyl esters of acids sold under the tradename "Versatic" acids; vinyl halides such as vinyl chloride, vinylidene chloride, vinyl fluoride; unsaturated mono- and di-carboxylic acids, for example, alkenoic acids, such as acrylic acid, methacrylic acid; alkenedioic acids such as maleic acid, fumaric acid, itaconic acid, crotonic acid, citraconic acid; as well as the mono- or di-ester of the named acids with alkanols and alkane-diols having from 1 to 16 carbon atoms such as methyl acrylate, butyl acrylate, monobutyl maleate, methyl methacrylate, dimethyl maleate, diethyl maleate, di-n-butyl maleate, dimethyl fumarate, diethyl fumarate, di-n-butyl fumarate, diethylhexyl fumarate, hydroxyethyl acrylate, hydroxypropyl acrylate, hydroxyethyl methacrylate, hydroxypropyl methacrylate; n-vinyl compounds such as vinyl pyrrolidone, N-vinylcarbazole, N-vinyl methylacetamide and N-vinyl acetamide; unsaturated alcohols, for example, alkenols such as allyl alcohol, 2-methylbuten-3-ol-2; acrylamide; methylolacrylamide, methacrylamide; maleic acid monoamide; crotonic acid amide; vinyl sulfonate.

The named other comonomers can individually or in mixtures with each other replace up to 40% of the vinyl ester. The vinyl esters are all charged at once; the comonomers can be all charged at once or dosed in.

As dispersion auxiliaries in the emulsion polymerization reaction it is possible to employ all the conventionally used emulsifiers and protective colloids. Protective colloids may be used alone; emulsifiers may be used alone; or mixtures of emulsifiers with protective colloids may be applied. Examples of protective colloids are polyvinyl alcohol, partially acetylated polyvinyl alcohols, water soluble cellulose ether derivatives, such as hydroxyethyl cellulose, hydroxypropyl cellulose, methyl cellulose, ethyl cellulose, carboxymethyl cellulose, water soluble starch ethers; polyacrylic acid or water soluble polyacrylic acid copolymerizates with acrylamide and/or alkyl esters; poly-N-vinyl compounds of open-chain or cyclic carboxylic acid amides.

As emulsifiers it is preferred to use anionic, cationic and non-ionic emulsifiers. Suitable anionic emulsifiers are alkali metal salts of alkyl sulfates, monosulfates of dihydric alcohols with more than 10 carbon atoms, alkyl sulfonates, alkylaryl sulfonates, alkyl and aryl disulfonates, such as tetrapropylenebenzene sulfonate, sulfates and phosphates of alkyl- and alkylaryl-polyethoxy alkanols and sulfosuccinic acid esters with 9 to 20 carbon atoms for each alkyl residue. Suitable cationic emulsifiers are, for example, alkyl ammonium salts, alkyl phosphonium salts and alkyl sulfonium salts. Non-ionic emulsifiers include the addition products of 5 to 50 mols of ethylene oxide and/or propylene oxide to straight chain or branched chain alkanols with 6 to 22 carbon atoms, to alkyl phenols, to higher fatty acids, to higher fatty acid amides, to primary and secondary higher fatty amines as well as block copolymerizates of propylene oxide with ethylene oxide.

Redox catalysts suitable for the polymerization consist of water soluble reducing agents, optionally with the addition of heavy metal ions and one peroxide component.

The following compounds are of interest as reducing agents: water soluble alkali metal salts and alkaline earth salts of sulfites, bisulfites, pyrosulfites, dithionites, dithionates, thiosulfates, formaldehyde sulfoxylate as well as molecular hydrogen, adsorbed on colloidal dispersed precious metal sols of the eighth subgroup of the Periodic Chart as described in DAS 1,133,130.

The heavy metal ions, such as iron, copper, nickel, cobalt, chrome, molybdenum, vanadium, cerium are usually applied as chlorides and sulfates.

Suitable peroxides are all inorganic percompounds which are customarily employed in redox catalyst systems, such as hydrogen peroxide; alkali metal persulfates such as sodium persulfate, potassium persulfate, ammonium persulfate; alkali metal perborates; alkali metal perphosphates; alkali metal percarbonates; as well as organic percompounds, particularly organic peroxides and hydroperoxides, such as tertiary-butyl hydroperoxide, cumene hydroperoxide, di-tertiarybutyl hydroperoxide, acetyl peroxide, benzoyl peroxide, lauroyl peroxide and 2,4 - dichlorobenzoyl peroxide, as well as acetylcyclohexane sulfonyl peroxide.

The concentrations of the reducing agents, used for the polymerization range from 0.01 to 0.5% by weight, based on the polymerizate. The concentrations of the heavy metal salts are maintained from 0% to below 0.001% by weight, based on the polymerizate, and the concentrations of the percompounds range from 0.005 to 0.5% by weight, based on the polymerizate. It is preferable that the amount of reducing agent, based on the totally required amount of oxidation agent, being at least one reducing equivalent to one oxidation equivalent.

The pH value can be adjusted by the addition of buffers, such as alkali metal acetates, alkali metal carbonates, alkali metal phosphates, alkali metal hydroxides, such as sodium hydroxide, ammonium hydroxide or acids, such as hydrochloric acid, acetic acid, formic acid. Preferably the polymerization is performed at a pH value of from 3 to 6. The known regulators for the adjustment of the molecular weight, such as aldehydes, chlorinated hydrocarbons or mercaptans, can be used simultaneously therewith.

According to the new process, a high percentage ethylene-vinyl ester copolymer dispersion with up to 70% solid content may be prepared. The dispersions prepared according to the invention and in regard to the ethylene content, form flexible films with improved tear resistance and a very highly durable stability under static load. They have a high molecular weight. The K-values, measured in acetone, according to Fikentscher (Cellulosechemie, Vol. 13, p. 58 [1932], lie above 70.

The dispersions are excellently suitable for adhesives, such as binders for paints and for plastering on masonry and wood, such as binders for fibrous substances like textile fleeces, cellulose fibers, leather fibers. The dispersions are further suitable for the preparation of coating materials, for instance, on paper, leather, wood, soundproofing materials, fillers, as well as additives to hydraulically hardening substances like cement, and are further suitable as soil-improving agents.

The following specific examples are illustrative of the invention without being limitative in any manner thereof.

EXAMPLE 1

Figure 1B:
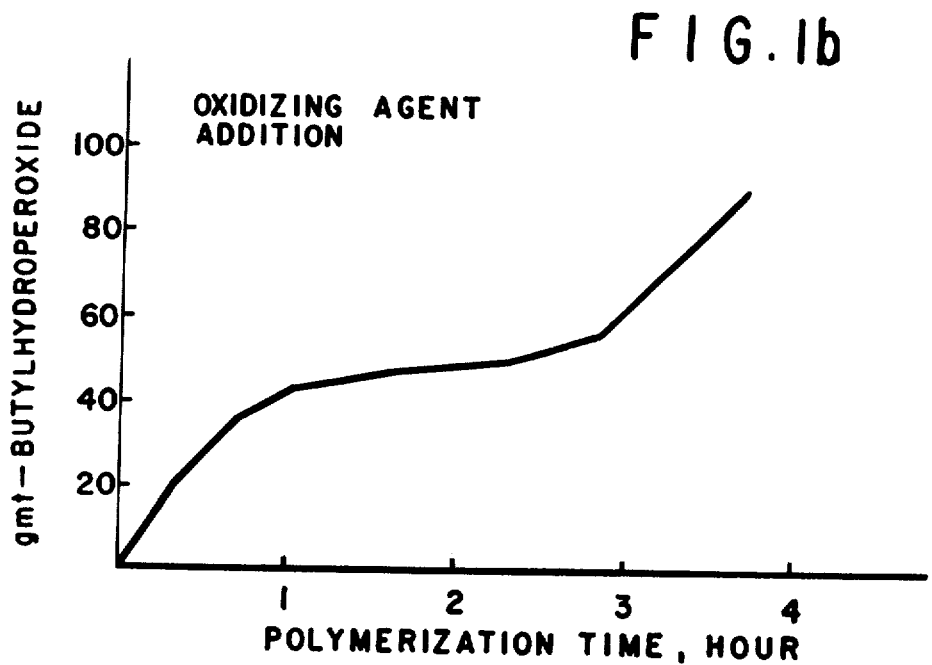
FIG. 1b shows the oxidizing agent addition as a function of the polymerization time.

In a 270 liter agitator autoclave, which is equipped with devices for dosing-in and sample-taking as well as heating and cooling installations, is charged a solution of 6 kg. of polyvinyl acetate (PVA with a viscosity of 20 cps. for a 4% aqueous solution and a saponification number of 100) in 100 liter of water containing 0.24 kg. sodium sulfite. After flushing the autoclave with nitrogen, 100 kg. of vinyl acetate are added while stirring; the temperature is then raised to 50° C. Ethylene is then pumped into the autoclave until a pressure of 45 at. abs. pr. is attained. The polymerization is controlled by the varying and continuous addition of a solution of 90 gm. of t-butylhydroperoxide in a mixture of 6 kg. of methanol and 6 kg. of water at 50° C., dependent upon the cooling capacity of the reactor. The added amounts of the required t-butylhydroperoxide corresponds to the momentary consumption of the peroxide by the reaction, and thereby vary considerably. Thus, for the first hour, the required amount of t-butylhydroperoxide which must be added is 45 gm., while for the second and third hours 20 gm. total are required. The exact amounts of peroxide added and the simultaneous utilization of the cooling capacity of the autoclave can be seen from FIG. 1. The polymerization instantaneously responds to an increase or reduction of the peroxide supply. Thus, a rise in pressure during the polymerization is avoided. After about 2.5 hours the dispersion has attained a solid content of 45%. The reaction now starts to flatten out, and the dosing of the peroxide is adjusted accordingly, so that another 25 gm. of the peroxide are dosed-in in one hour. After one hour of after-polymerization it is cooled and excess ethyleen removed by lowering the pressure in the autoclave and flushing with nitrogen.

A stable dispersion with a residual monomer content of 0.3% is obtained. The ethylene content of the polymerizate is 15%, the K-value is 100. The tear strength of the polymerizate is 60 kp./cm.$^2$, while its tear extension is 700%.

EXAMPLE 2 (COMPARISON)

The procedure is the same as in Example 1, however, the t-butylhydroperoxide solution is added with a constant speed of 30 gm. of peroxide per hour. After an initially sluggish polymerization, the reaction becomes so violent that the cooling capacity of the reactor is no longer sufficient for safe operation, since the pressure and temperature of the reaction medium temporarily rise very strongly. After 3 hours of polymerization, the solid content is only 30%. Only after a subsequent addition of 40 gm. of peroxide in the course of 3 hours does the polymerization reaction proceed to completion. The dispersion has a high degree of residual monomer of about 2% with a K-value of 67.

EXAMPLE 2A (COMPARISON)

The procedure is the same as in Example 2, however, 15 gm. per hour of t-butylhydroperoxide is constantly dosed in. After an initially slow and irregular starting polymerization, the subsequent portions of the reaction have phases of violent reaction with pressure rises occurring. The remaining content of residual monomers is higher than that produced in the procedure according to Example 1, even though there was a dosing time of 5 hours and an after-polymerization time of 2 hours. The cooling capacity of the autoclave could not be fully utilized.

EXAMPLE 3

The procedure is the same as in Example 1, but the ethylene pressure was adjusted to 40 at. abs. pr. and was kept constant from the beginning to the end of the polymerization. A stable dispersion was obtained with an ethylene content of 21% and a K-value of 97. The tear resistance of the film was 30 kp./cm.$^2$, with a tear extension of 1000%.

EXAMPLE 4

The procedure is the same as in Example 1; however, the ethylene pressure is adjusted to 20 at. abs. pr. and is kept constant at this pressure until 70% of the vinyl acetate is polymerized. A stable dispersion with an ethylene content of 10% and a K-value of 115 is obtained. The tear resistance of the film was 109 kp./cm.$^2$, with a tear extension of 550%.

EXAMPLE 5

The procedure is identical to Example 1, with the initial ethylene pressure of 10 at. abs. pr. at the start of the polymerization. No new ethylene is added during the polymerization. A stable dispersion with an ethylene content of 5% and a K-value of 120 is obtained. The tear strength of the film is 150 kp./cm.$^2$, the tear extension is 300%.

EXAMPLE 6 (COMPARISON)

The procedure is the same as in Example 1, except as follows: instead of initially adding the sodium sulfite, 90 gm. of t-butylhydroperoxide is initially charged. In this procedure, the 0.24 kg. of sodium sulfite are added over 3 hours at a rate of 0.08 kg. per hour dissolved in 10 kg. of water. This solution is dosed-in during the polymerization. After the start of the dosing of the sulfite solution, the polymerization starts quickly and violently, proceeds irregularly, and can finally be kept going only by multiple renewed addition of the oxidation agent and the reducing agent. Polymerization time is 7 hours and after polymerization of 3 hours to a 29% solids content. A residual monomer content of 4% remains. This example shows that by dosing-in only the reducing agent, the polymerization reaction is irregular. Thus, it is impossible to measure the respective consumption of the components so that the regulation of the polymerization speed at the limit of the cooling capacity is impossible. The reaction speed does not quickly respond to the increase or reduction of the dosed-in reducing agent and proceeds only partly parallel to it.

EXAMPLE 7

Figure 2A:
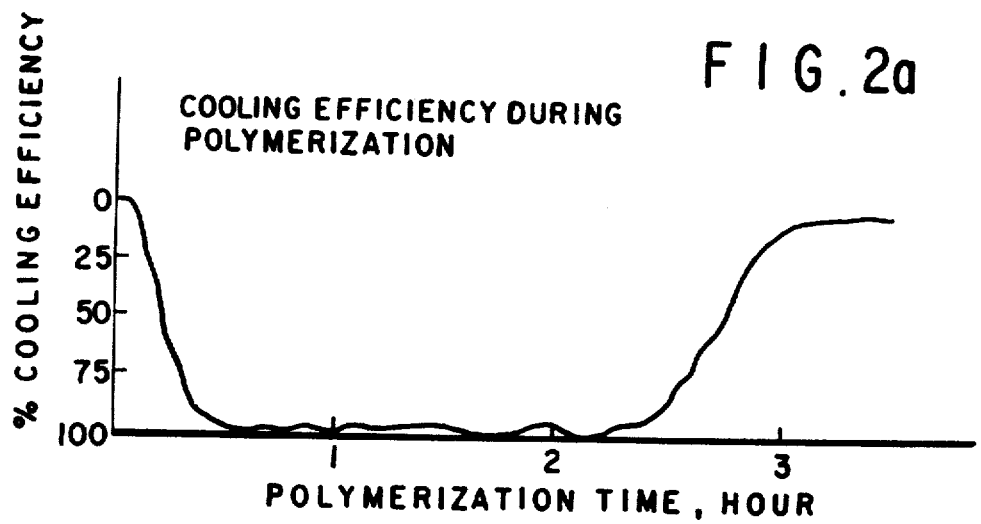
FIG. 2a shows the cooling efficiency during polymerization as a function of the polymerization time.
Figure 2B:
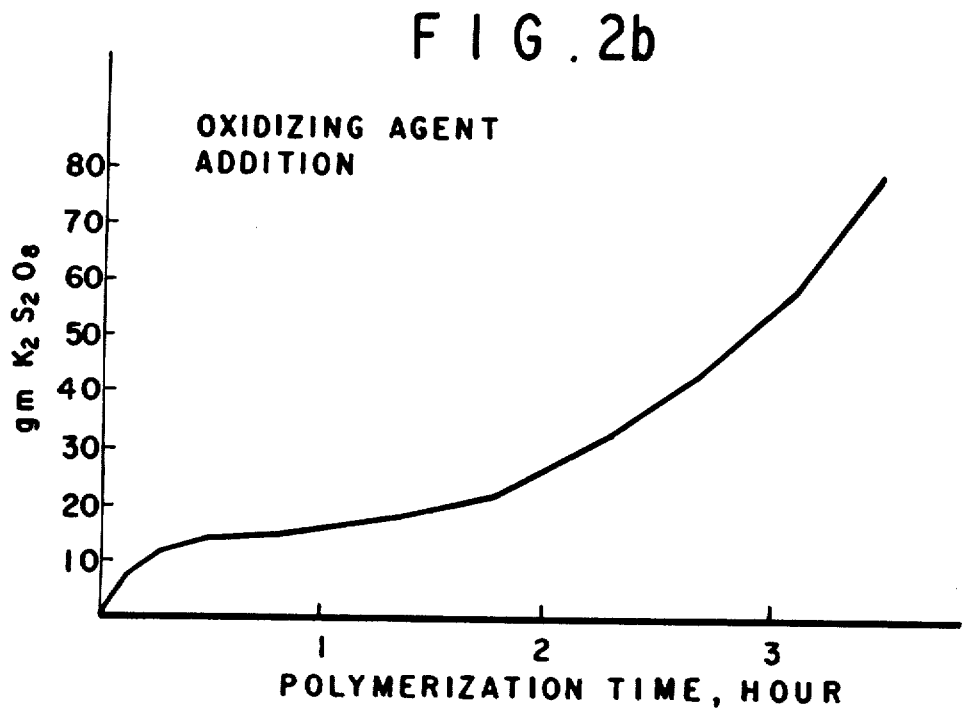
FIG. 2b shows the oxidizing agent addition as a function of the polymerization time.

In an autoclave, as described in Example 1, a solution of 6 kg. of polyvinyl alcohol with saponification number 140 is charged in 100 liters of water. The system is flushed with nitrogen to rid the autoclave of air and oxygen. 100 kg. of vinyl acetate and 0.2 liters of a 0.1% palladium sol are added and with stirring heated to 40° C. Then 33 at. abs. pr. of ethylene and 2 at. abs. pr. of hydrogen are pumped into the autoclave. The polymerization is controlled by the dosing-in of a solution of 80 gm. of potassium persulfate in 20 liters of water, whereby the addition of the solution is adjusted to compensate for the momentary consumption thereof. The required changes in the amounts of potassium persulfate dosed into the solution are shown in FIG. 2 together with the utilization of the cooling capacity of the reactor. The polymerization reaction is safely maintained at a constant polymerization temperature of 40° C. with a simultaneously complete utilization of the cooling capacity of the autoclave without a pressure rise. The dosed-in amount of potassium persulfate, corresponding to the momentary consumption thereof, can be adjusted through the instantaneous response of the cooling effect to the increase or reduction of the persulfate addition. During the first half hour 15 gm. of potassium persulfate are dosed-in; during the next period to 2½ hours only 21 gm. are dosed-in; and during the last hour 54 gm. are dosed-in (cf. FIG. 2). After another hour of after-polymerization, the residual ethylene is removed by reducing the pressure to normal atmospheric and by flushing with nitrogen. A stable dispersion having an ethylene content of 15% and a K-value of 124 is obtained. The tear resistance of the film is 70 kp./cm.$^2$, while the extension is 700%.

EXAMPLE 8

Into an autoclave, as described in Example 1, is charged a solution of 4.0 kg. of nonylphenol polyethylene oxide with 20 ethylene oxide units per molecule, 0.5 kg. of sodium alkylsulfonate with 14 to 16 carbon atoms, 1.5 kg. of acrylic acid, 1.0 kg. of acrylamide, 1 gm. of iron(II)-sulfate and 0.25 kg. of sodium sulfite in 110 liter of water. The system is purged of oxygen by flushing with nitrogen, and is then heated to 50° C. Then 100 kg. of vinyl acetate are added to the solution and an ethylene pressure of 54 at. abs. pr. is established. The polymerization is regulated by continuous dosing-in varied amounts of a solution of 100 gm. of t-butylhydroperoxide in 6 kg. of methanol and 6 kg. of water, corresponding to the peroxide consumption at that moment. After 4.5 hours of reaction time, a solid content of 44% is reached. The ethylene supply is terminated. The residual peroxide solution is added in increasing portions in the course of 2 hours and an after-polymerization is performed for another two hours. After the pressure has been reduced, the residual ethylene is removed by a slight vacuum. A stable dispersion with an ethylene content of 28% and a K-value of 88 is obtained. The film has a tear resistance of 8 kp./cm.$^2$ at a tear extension of 1400%.

EXAMPLE 9

Into an autoclave, as described in Example 1, is charged a solution of 0.4 kg. of hydroxyethylcellulose with a viscosity of 100 cps. for a 2% aqueous solution, 1.2 kg. of polyvinylpyrrolidone "K 90," 3.0 kg. of nonylphenol polyethylene oxide with 15 ethylene oxide units per molecule, and 0.2 kg. of sodium dodecylbenzene sulfonate in 100 kg. of water. The autoclave is flushed to remove the air and oxygen. Then 60 kg. of vinyl acetate, 20 kg. of vinyl chloride and 0.2 kg. of a 1% aqueous palladium sol are added. After heating the solution to 45° C., the system is pressurized with ethylene to a pressure of 45 at. abs. pr. and then an additional 2 at. abs. pr. of hydrogen are pumped in. The polymerization is regulated according to the momentary peroxide consumption by the dosing-in of a solution of 100 gm. of potassium persulfate in 20 liters of water. Starting at the beginning of the polymerization reaction, another 20 kg. of vinyl chloride are dosed-in over the next 2 hours. Then for another 4 hours the temperature is kept at 50° C., the pressure reduced to normal and residual monomers removed by flushing with nitrogen. A stable dispersion with a solid content of 51% and an ethylene content of 16% is obtained. The polymerizate has a K-value of 78, a tear resistance of 180 kp./cm.$^2$ and an extension of 600%.

EXAMPLE 10

This procedure is analogous to Example 20 of the DAS 1,267,429, but prepared according to the process of the invention.

Into an autoclave, as described in Example 1, are added 85 kg. of water containing 2.6 kg. of dissolved alkylphenol polyethylene oxide with 20 ethylene oxide units, 0.85 kg. of the sodium salt of a sulfonated alkane with 14 carbon atoms, 0.55 kg. of acrylamide and 0.21 kg. of hydroxyethylcellulose with a viscosity of 400 cps. (for a 2% aqueous solution). Then 0.15 kg. of sodium formaldehydesulfoxylate and 85 kg. of vinyl acetate are added. After thoroughly flushing the system with nitrogen, the mixture is heated to 50° C. and ethylene is pumped into the autoclave to a pressure of 20 at. abs. pr. By means of the continuous addition of 60 gm. of t-butylhydroperoxide in a mixture of 5 liters of water and 5 liters of methanol, always adjusted to the momentary peroxide consumption, which is continuous with a complete utilization of the full cooling effect, the polymerization is achieved. After 2.5 hours, the polymerization is almost terminated; the ethylene supply is stopped; and the residual t-butylhydroperoxide solution is added during the subsequent 2 hours. Subsequently by reduction of the pressure and by evacuation of the system, the excess ethylene is removed. A stable aqueous dispersion with an ethylene content of 10.5% and a K-value of 98 is obtained. The film has a tear resistance of 88 kp./cm.$^2$.

In the procedure given in the DAS 1,267,429, on the contrary, it is disclosed that the charging of the total monomeric vinyl ester cannot be controlled. In the embodiment disclosed in the DAS 1,267,429, there is a partial charging of the vinyl ester and the dosing of the remainder. Each time the catalyst is dosed-in in an exact portion to the vinyl ester, the result is an irregular polymerization producing a dispersion with an ethylene content of 11.6%, whose polymerizate possesses a K-value of only 38 and a tear resistance of only 23 kp./cm.$^2$.

On the basis of the low K-value, the static loading capacity is low and a high surface stickiness is present.

Figure 3:
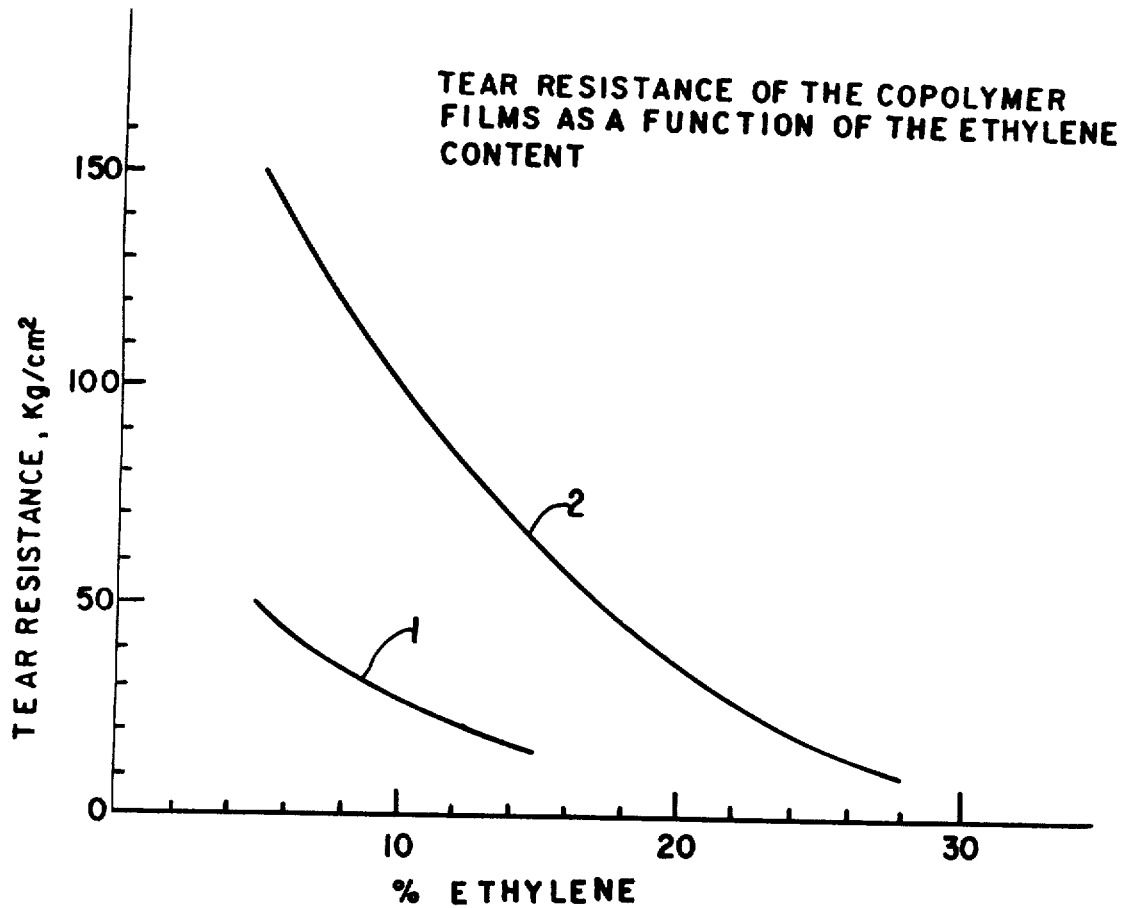
FIG. 3 shows the tear resistance of the copolymer films as a function of the ethylene content.

In FIG. 3 the substantially higher tear resistances of the polymerizate films, attained with the process of the invention, are contrasted to those obtained by the procedure, according to the DAS 1,267,429, both as a function of the ethylene content. The results according to the DAS 1,267,429 are illustrated by the curve 1; the results obtained according to the invention are found in curve 2.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the process for the preparation in a cooled zone of stable aqueous solid copolymerizates from ethylene and free radical polymerizable ethylenically unsaturated monomers, containing from 5% to 50% by weight of ethylene units which comprises the step of polymerizing a monomeric mixture consisting essentially of (A) from 5% to 50% by weight of ethylene and (B) from 50% to 95% by weight of vinyl monomer mixtures consisting essentially of (a) from 60% to 100% by weight of said vinyl monomer mixture of vinyl esters of alkanoic acids having 1 to 18 carbon atoms, and of (b) from 0% to 40% by weight of said vinyl monomer mixture of other free radical polymerizable ethylenically unsaturated monomers selected from the group consisting of vinyl halides, vinylidene halides, ethylenically unsaturated monocarboxylic acids, their acid amides, and their monoesters or diesters with alcohols having 1 to 16 carbon atoms, ethylenically unsaturated dicarboxylic acids, their acid amides, and their monoesters or diesters with alcohols having 1 to 16 carbon atoms, N-vinyl compounds, alkenols, acrylamide, methylolacrylamide, vinyl sulfonate and the mixtures thereof, in an aqueous dispersion at a temperature of between 0° C. and 100° C. utilizing a redox polymerization catalyst system comprising (1) from 0.01 to 0.5% by weight based on the polymerizate of a reducing agent selected from the group consisting of (i) water soluble alkali metal salts of anions selected from the group consisting of sulfites, bisulfites, pyrosulfites, dithionites, dithionates, thiosulfates and formaldehyde sulfoxylate (ii) water soluble alkaline earth salts of anions selected from the group consisting of sulfites, bisulfites, pyrosulfites, dithionites, dithionates, thiosulfates and formaldehyde sulfoxylate, and (iii) molecular hydrogen adsorbed on colloidal dispersed precious metal sols of the eighth subgroup of the Periodic Chart, and (2) from 0.005 to 0.5% by weight based upon the polymerizate of a percompound selected from the group consisting of hydrogen peroxide, alkali metal persulfates, alkali metal perborates, alkali metal perphosphates, alkali metal percarbonates, organic peroxides and organic hydroperoxides, within a cooled zone, the improvement which comprises continuously dosing into said aqueous dispersion during said polymerization an aqueous solution of said percompound at a rate dependent on the cooling capacity of said cooled zone whereby a constant predetermined polymerization temperature is maintained.

2. The process of claim 1 in which the continuous dosing of the percompound is carried out so that said predetermined polymerization temperature and the discharge temperature of the cooling water from said cooled zone are kept constant, by increasing the dosing if the temperature of said polymerizing aqueous dispersion decreases and by decreasing the dosing if the temperature increases.

3. The process of claim 1 in which the amount of said reducing agent equals at least one reduction equivalent for one oxidation equivalent of said percompound.

4. The process of claim 1 in which said ethylene monomer component is a pressurized gas having a pressure of between 3 to 150 atmospheres absolute pressure.

5. The process of claim 4 in which the ethylene pressure is between 5 to 100 atmospheres absolute pressure.

6. The process of claim 1 in which the percompounds are selected from the group consisting of hydrogen peroxide, alkali metal persulfates, alkali metal perborates, alkali metal percarbonates, tertiary-butyl hydroperoxide, di-tertiarybutyl peroxide, acetyl peroxide and lauroyl peroxide.

7. The process of claim 1 in which heavy metal ions are added in amounts up to 0.001% by weight, based on the polymerizate, to said aqueous dispersion.

8. The process of claim 1 in which further amounts of ethylene are added during the reaction.

9. The process of claim 1 in which further amounts of said free radical polymerizable ethylenically unsaturated monomer are added during the reaction.

10. The process of claim 1 in which further amounts of ethylene and said free radical polymerizable ethylenically unsaturated monomer are added during the reaction.

References Cited

UNITED STATES PATENTS

| | | | |
|---|---|---|---|
| 3,345,318 | 10/1967 | Lindemann et al. | 260—29.6 TA |
| 3,404,112 | 10/1968 | Lindemann et al. | 260—29.6 T |
| 3,578,618 | 5/1971 | Beardsley | 260—29.6 R |
| 3,642,680 | 2/1972 | Jennings et al. | 260—29.6 R |
| 3,645,952 | 2/1972 | Lindemann et al. | 260—29.6 TA |
| 3,297,618 | 1/1967 | Glabisch et al. | 260—29.6 TA |
| 3,399,157 | 8/1968 | Deex et al. | 260—29.6 R |
| 3,519,590 | 7/1970 | Henry et al. | 260—29.6 R |
| 3,532,658 | 10/1970 | Gintz | 260—29.6 R |

HAROLD D. ANDERSON, Primary Examiner

U.S. Cl. X.R.

260—17 A, 17.4 ST, 29.6 H, 29.6 T, 29.6 TA, 29.6 M, 29.6 MM, 29.6 RW